United States Patent

[11] 3,628,714

| [72] | Inventor | Josef Offenwanger<br>Lombard, Ill. |
|---|---|---|
| [21] | Appl. No. | 3,746 |
| [22] | Filed | Jan. 19, 1970 |
| [45] | Patented | Dec. 21, 1971 |
| [73] | Assignee | Signode Corporation |

[54] FRAME-NAILING MACHINE
19 Claims, 13 Drawing Figs.

[52] U.S. Cl. .................................................... 227/7,
227/100, 227/152
[51] Int. Cl. ........................................................ B27f 7/02
[50] Field of Search ............................................ 227/2, 3, 4,
5, 6, 7, 99, 100, 101, 103, 152, 153; 144/288 C

[56] References Cited
UNITED STATES PATENTS

| 2,755,470 | 7/1956 | Johnson ....................... | 227/101 |
| 2,884,967 | 5/1959 | Le Vay ......................... | 144/288 C |
| 3,086,210 | 4/1963 | Good et al. ................... | 227/99 |
| 3,302,942 | 2/1967 | Hollomon ..................... | 144/288 C X |
| 3,381,870 | 5/1968 | Haskins ........................ | 227/3 |

*Primary Examiner*—Granville Y. Custer, Jr.
*Attorney*—Dressler, Goldsmith, Clement & Gordon

ABSTRACT: A framing machine for assembling skeleton frames such as wall sections made of 2 by 4 inch studs and plates. The framing machine includes a support bed defining a work surface, and which bed guides a traveling work carriage driven therealong from one end to the other. The plates are spacedly supported in a parallel relationship on the work surface and the studs are perpendicularly positioned intermediate the plates. The traveling work carriage moves along the plates continuously, traversing the studs and sensing the location of each stud, whether single or multiple abutting, to actuate an associated fastener driver carried by the carriage. Fastener drivers are provided at each side to drive at least two fasteners into each stud, through each abutting plate, thereby to assemble a wall section.

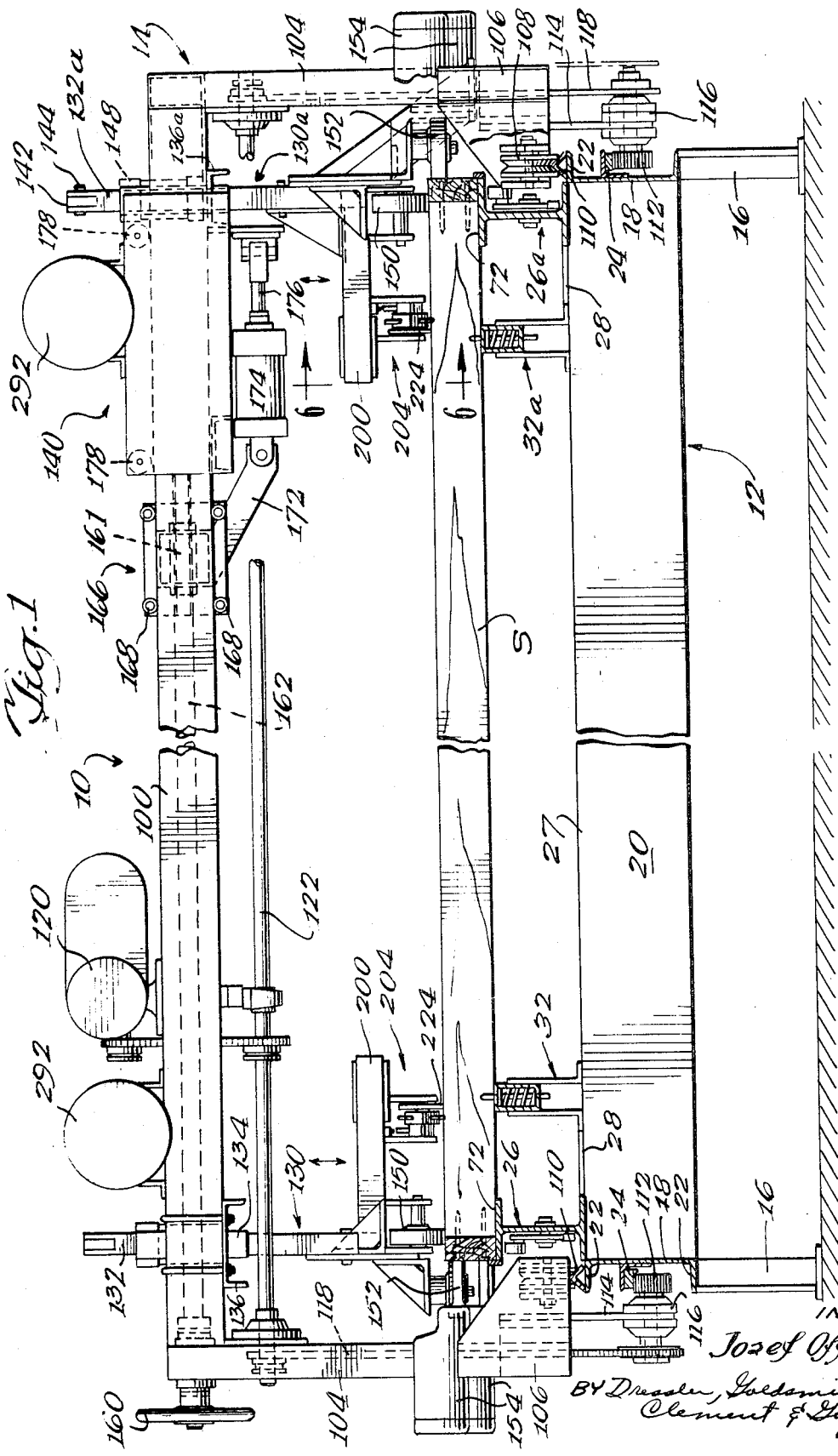

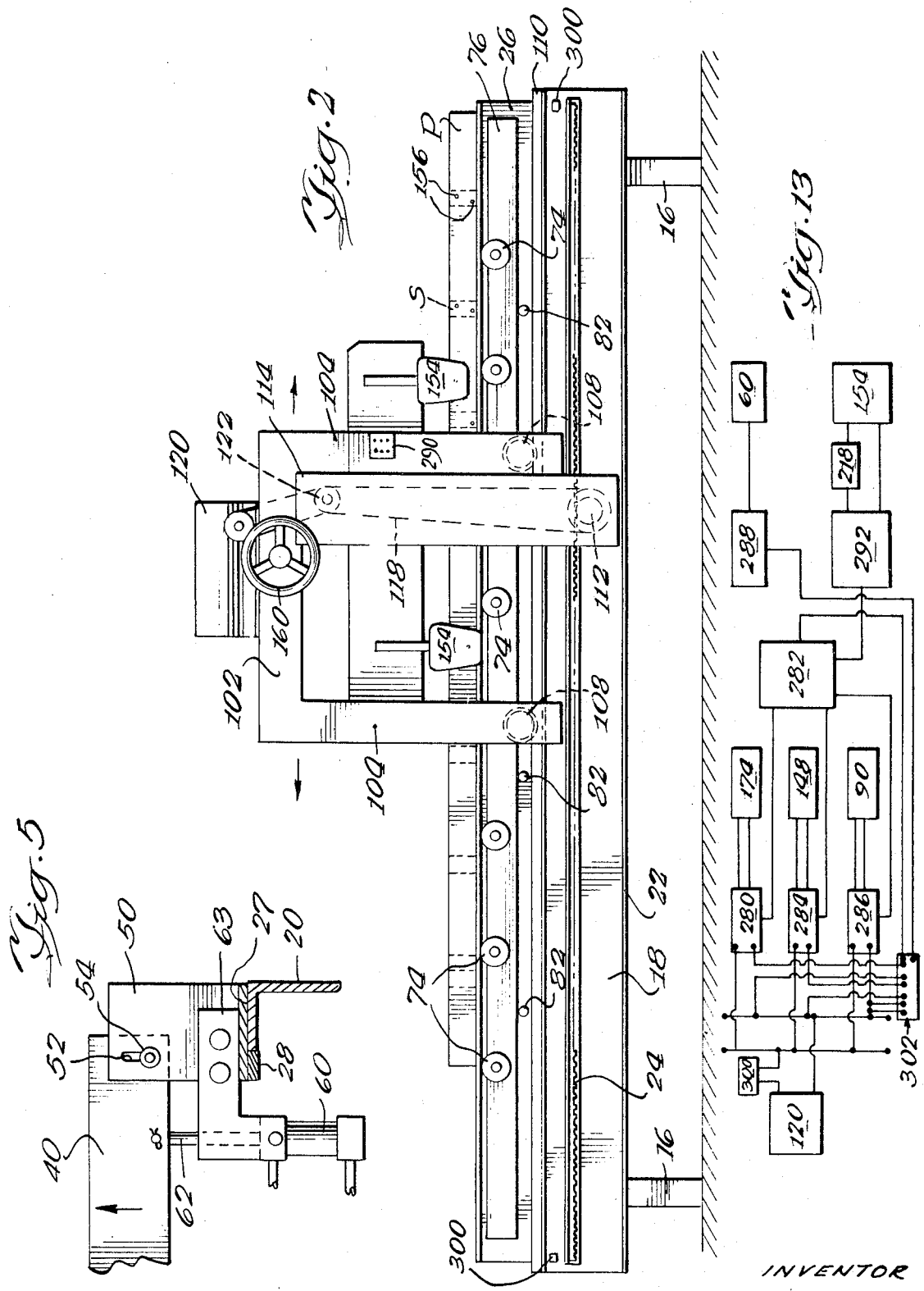

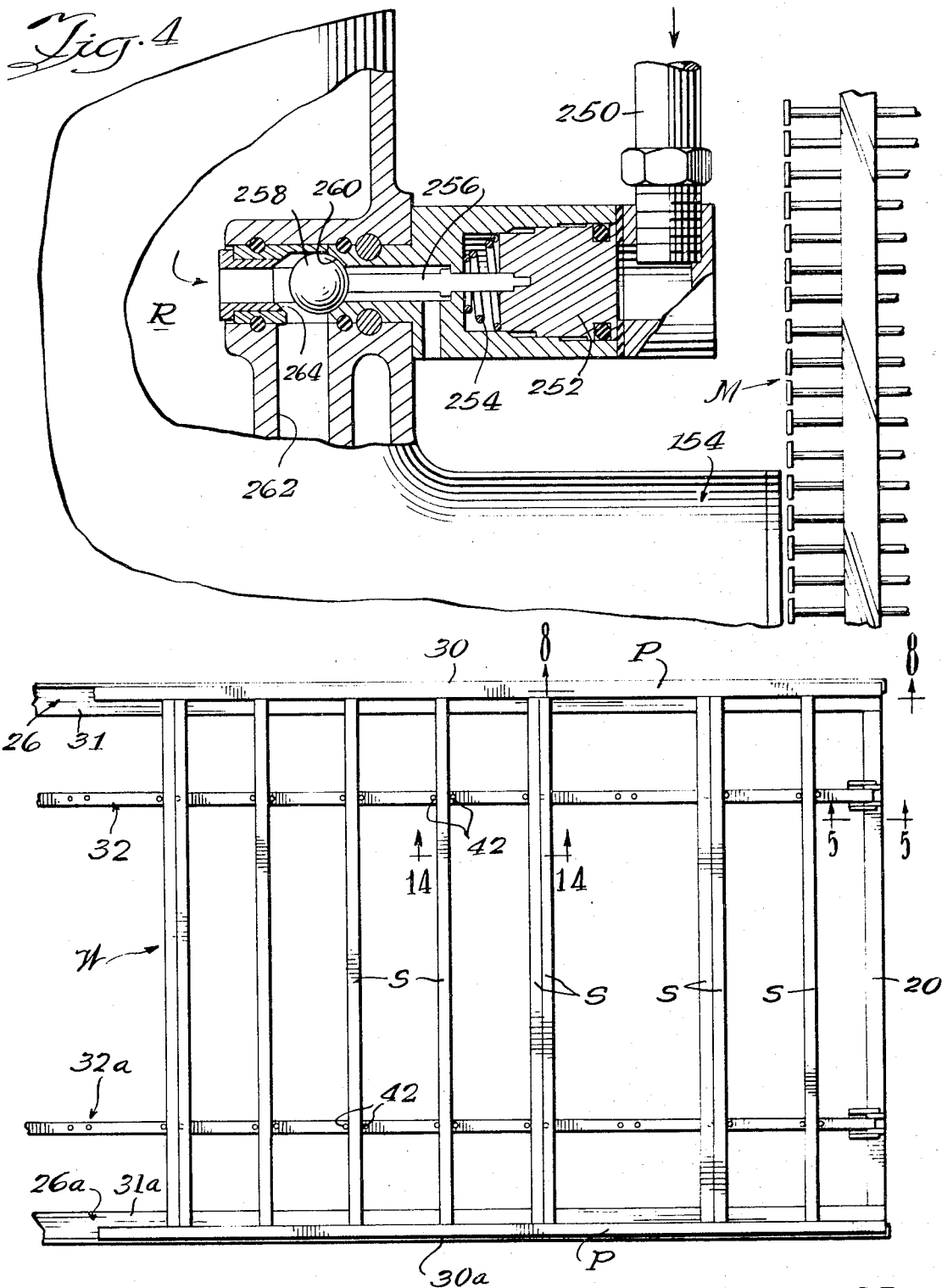

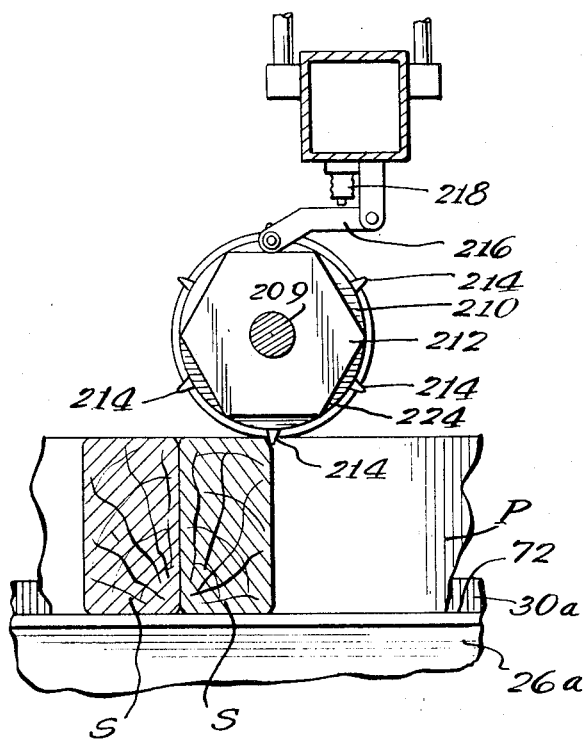
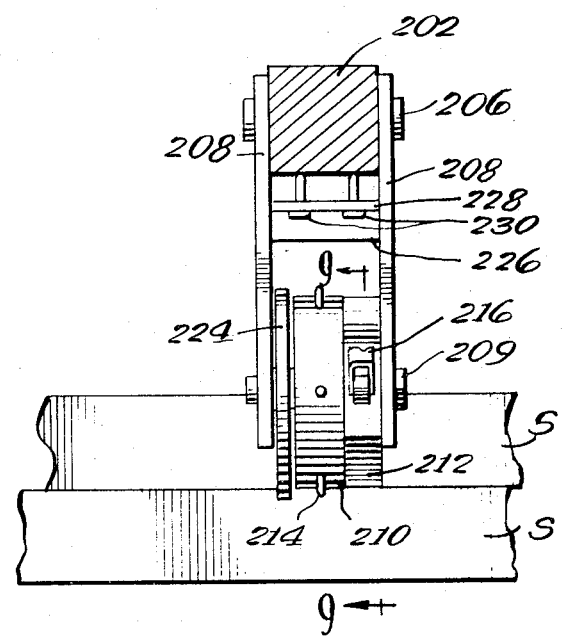
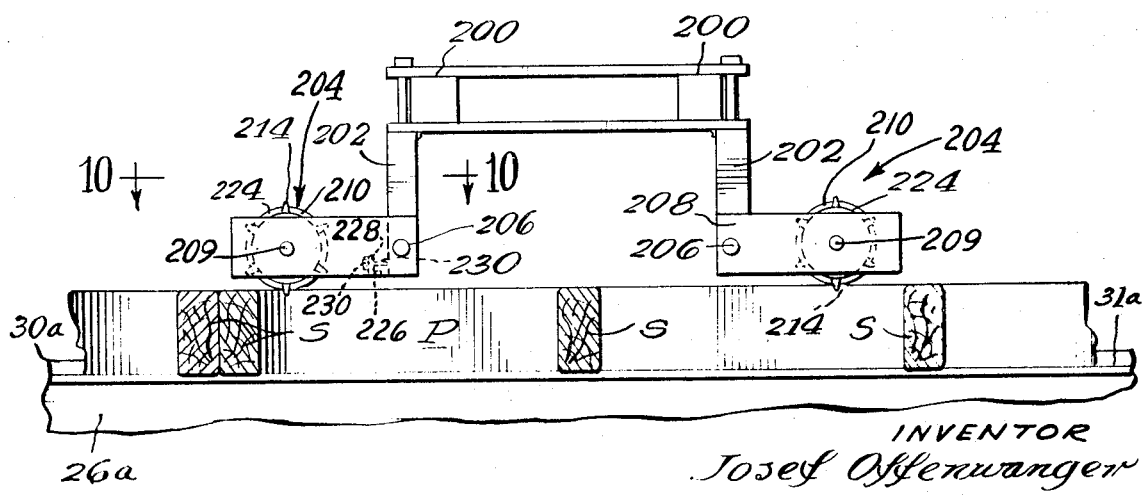

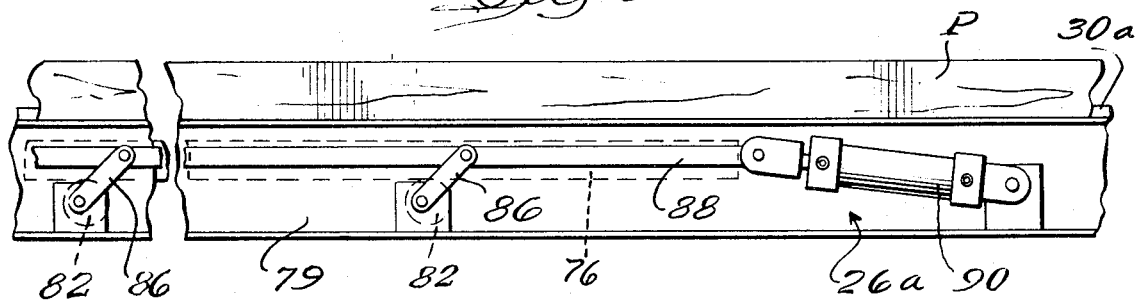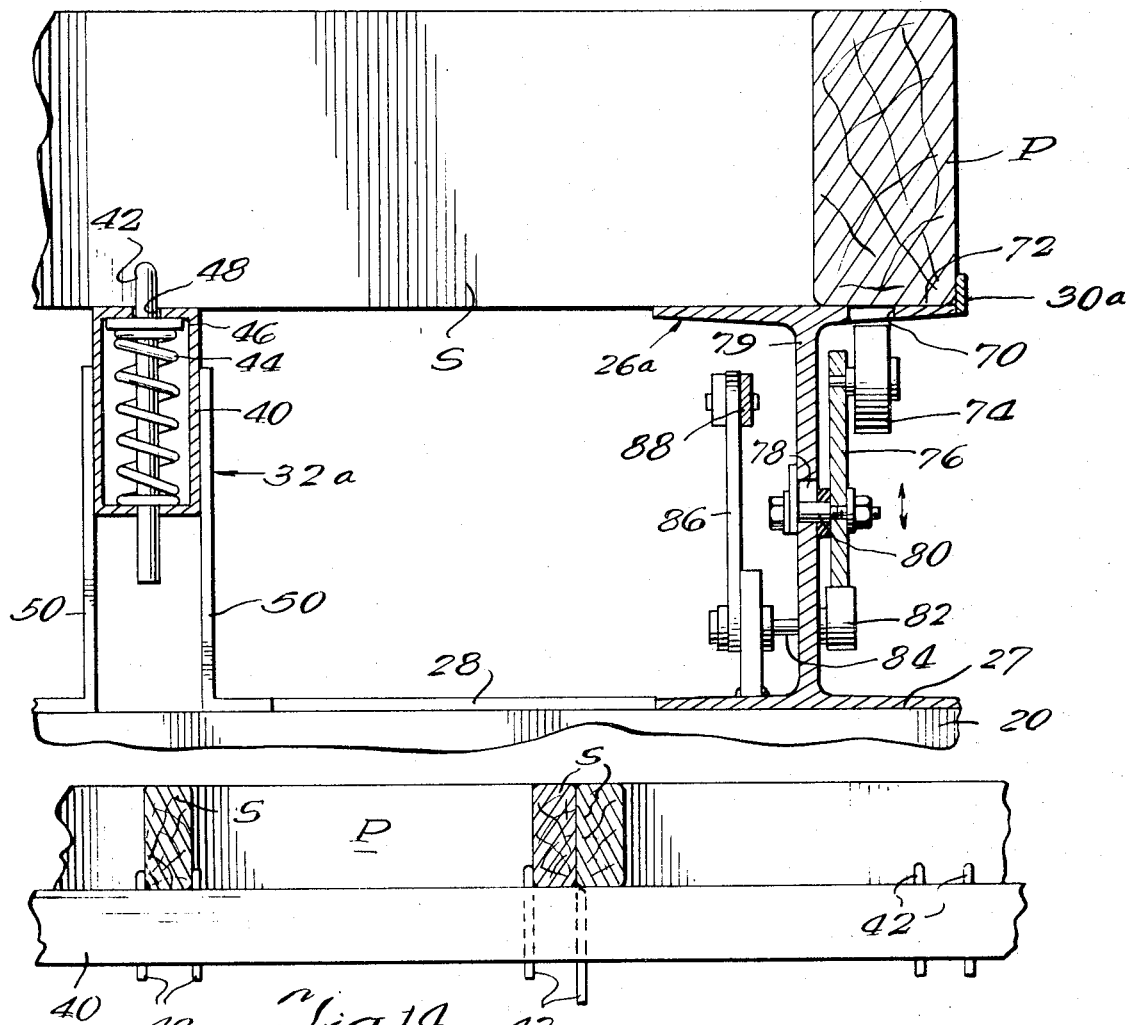

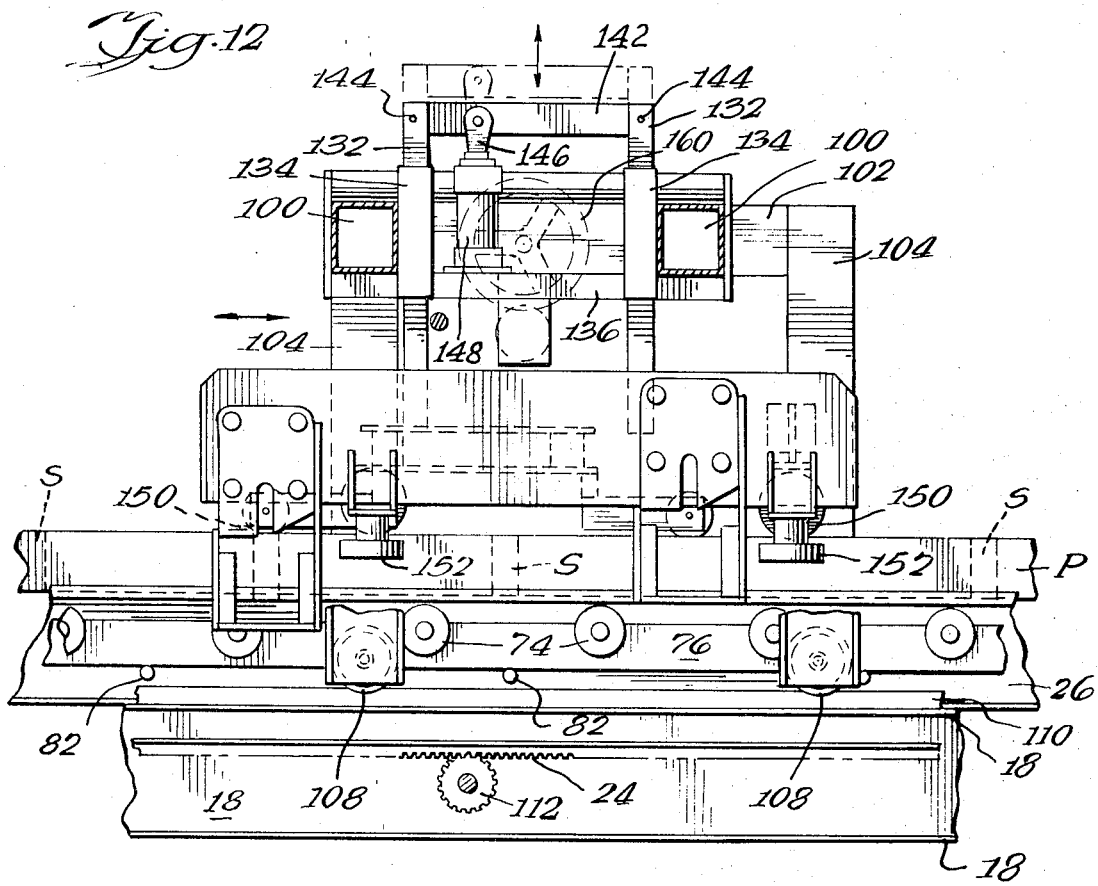
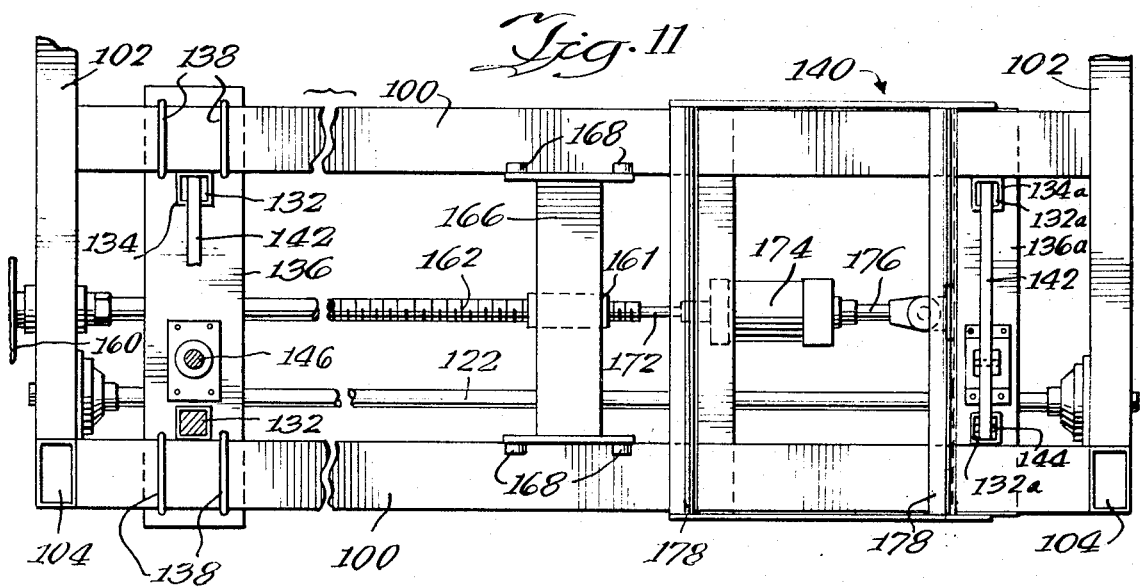

FRAME-NAILING MACHINE

This invention relates to a framing machine. The framing machine is adapted to assemble prefabricated skeleton wall sections such as from 2 by 4 inch plate and stud wood stock arrays. Pneumatic fasteners carried by the machine automatically fasten a plurality of studs to a pair of parallel-spaced plates by driving suitable fasteners, such as nails, through the plates and into the studs.

In the recent years the expense of conventional home building has increased quite rapidly. Increases in carpentry rates, for example, have resulted in a marked increase in the cost of such housing. As a result, it has become economically desirable to turn to prefabricated housing and to prefabricated preassembled units for use in building conventional housing more and more, so that more of the work that goes into such housing is done in factories and at factory labor rates.

One of the components of most houses are well-known plate and stud frame assemblies, as of nominal 2 by 4 inch wood, which frame assemblies serve to receive interior and exterior wall surfacings, such as panel boards.

The framing machine of this invention is adapted to automatically assemble a plurality of studs to a pair of plates to provide a prefabricated skeleton frame assembly adapted to be covered with wall surfacings.

To that end, the framing machine of this invention includes a bed assembly and a traveling carriage drivingly mounted on the bed assembly. The bed assembly provides a pair of spaced-apart work surfaces upon which the stringers or plates are positioned, between which plates a plurality of parallel spanners or studs are positioned. The ends of the studs rest upon the work surfaces of the bed assembly adjacent the plates.

The traveling carriage moves on and from one end of the bed assembly to the other, and along the plates. It traverses the spaced studs, which, as it traverses them, it nails each of them appropriately to the spaced-apart plates.

The traveling carriage carries a pair of nailing assemblies, which are relatively movable with respect to each other. This movement, preferably of one toward and away from the other, accommodates wall sections of different heights. The traveling carriage carries means for moving one of the nailing assemblies towards the other thereby to act against the opposed plates to bias them toward each other during the nailing operation.

Additionally, the nailing assemblies are reciprocably mounted so that squaring means carried by them move along and on the edges of the plates and the adjacent ends of the studs to square them in the vicinity of pneumatic nailers. Each of the nailing assemblies further carries stud locator assemblies which positively contact each stud as the traveling carriage moves from one end of the plates to the other. The stud locators are designed to automatically sense the presence of each stud, whether they be single-spaced studs or multiple adjoining or abutting studs, thereby to actuate an associated nailer once for each stud present. A stud locator is provided for each nailer so that each nailer is separately actuated in response to the sensed location of a stud as the traveling carriage traverses the studs.

The bed assembly also provides means for spacedly locating the studs along the longitudinal extent of the plates. Thus retractable locator bar assemblies mounting positioning pins are provided between the work surfaces and parallel to the plates. These locator bars are reciprocatably mounted to drop them and the positioning pins below the level of the work surfaces to facilitate removal of a finished wall section. Also to facilitate such removal, a movable conveyor means is provided which, when elevated through apertures in the work surface, provides a roller conveyor for rollingly supporting the plates for removing an assembled wall section from the framing machine.

This invention also provides a novel method for assembling a skeleton frame, such as a wall section, from a pair of parallel stringers and a plurality of perpendicularly positioned parallel spanners, at least some of which are spaced from each other, and which are positioned between said stringers. In that method the stringers and spanners are so positioned on a work surface in a skeleton frame array. Then, in the vicinity of a fastening means for fastening the stringers to the studs as by driving nails through the stringers into the studs while the fastening means are continuously moving from one end of the stringers to the other, the stringers are compressed toward each other to bias them against the intermediate spanners, and the stringers and abutting spanner ends are continuously squared. The fastening means are continuously guided along and on the work surface from one end of the stringers to the other and stop only after the stringers have been fully traversed.

Further, the method contemplates sensing each spanner, whether single or multiple abutting, to assure the actuation of an associated fastening means once for each spanner, and the sensing of each spanner twice, twice at each end, thereby to actuate associated fastening means to fasten each spanner twice at each end to the stringers.

These and other features, objects, and advantages of this invention will become apparent from the following description, and from the drawings of which:

FIG. 1 is an end elevation, partially in section, of a framing machine of this invention;

FIG. 2 is a side elevation taken from the left of FIG. 1, omitting some of the detail thereof;

FIG. 3 is a partial plan view of part of the bed assembly of FIG. 1;

FIG. 4 is a fragmentary view, partially broken away, of a pneumatic nailer of FIG. 1;

FIG. 5 (with FIG. 2) is a fragmentary side elevational view of an end portion of a locator bar assembly taken substantially along the line 5—5 of FIG. 3;

FIG. 6 is a fragmentary side elevational view of stud locator assemblies taken substantially along line 6—6 of FIG. 1;

FIG. 7 is an enlarged view of a portion of the rollout mechanism of FIG. 1.

FIG. 8 is a view taken substantially along the line 8—8 of FIG. 3;

FIG. 9 (with FIG. 6) is a fragmentary side elevational view taken substantially along line 9—9 of FIG. 10;

FIG. 10 (with FIG. 6) is a plan view taken substantially along line 10—10 of FIG. 6;

FIG. 11 is a fragmentary plan view of the traveling carriage, partially in section, of FIG. 1;

FIG. 12 is a fragmentary side view of the traveling carriage taken from the left of FIG. 1;

FIG. 13 is a schematic pneumatic and electrical circuit diagram, and

FIG. 14 (with FIGS. 7 and 8) is a sectional view taken substantially along line 14—14 of FIG. 3.

Framing machine 10 is especially adapted to assemble automatically a prefabricated skeleton wall section W, such as one fabricated of nominal 2×4 inch wood stock members. Of course other stock such as 2 by 2, 2 by 6, and the like may be used. Such typical wall section W is illustrated in FIG. 3, and is there seen to comprise a pair of spaced stringers or plates P and a plurality of perpendicularly oriented spanners or studs S. Studs S may be either single or multiple studs, depending upon the purpose for which, and the location in which a particular wall section W is to be used. Thus, for example, near one end of the plates P a double stud, i.e., a pair of abutting adjacent studs, may be provided, whereas intermediate the ends of the plates P pairs of more widely spaced double studs S may be provided, such as for receiving a door frame. The particular layout of stringers and spanners forming a wall section W per se framed on the framing machine of this invention forms no part of this invention.

Referring first to FIGS. 1 and 2, framing machine 10 comprises a bed assembly 12 and a traveling carriage 14 supported on, and continuously movable along, support bed assembly 12. Bed assembly 12 also supports and locates stringers or plates P and spanners or studs S.

Bed assembly 12 is horizontally supported on a plurality of floor mounted legs 16. Pairs of legs 16 mount a pair of spaced parallel support beams 18 which are rigidly secured to each other by two or more spaced parallel transverse cross beams 20. Intermediate support beam flanges 22, and connected, as by welding, to the outer faces of the webs of support beams 18, are a pair of spaced parallel longitudinal rack assemblies 24, one of which extends from one end to the other of each of the support beams 18. Rack assemblies 24 provide a means by which traveling carriage 14 is driven on and along support bed assembly 12 from one end to the other.

Transverse crossbeams 20, adjacent their points of connection to support beams 18 support a pair of longitudinal spaced parallel work beams 26, 26a which beams serve to support studs S and plates P and to provide work surfaces therefor during the formation of a wall section W. The work beams 26, 26a are supported on their bottom flanges on the upper flanged surfaces 27 of crossbeams 20. Work beams 26, 26a are provided with guide plates 28 which slidingly engage edges of the crossbeam flanged surface 27 to prevent longitudinal displacement of the work beams 26, 26a. At one side a guide plate 28 is secured to crossbeams 20 to prevent lateral movement (at the left of FIG. 1). At the other side, beam 26a is freely supported on surface 27 of crossbeam 20 to provide for lateral movement for a purpose to be explained later.

It will be observed that each work beam 26, 26a provided by bed assembly 12 defines an outer upstanding guard flange 30, 30a, the purpose of which is to prevent lateral outward movement of the studs and plates when they are supported upon the work surfaces 72 of work beams 26, 26a.

Adjacent each beam 26, 26a is an elongate locator bar assembly 32, 32a, respectively. These assemblies are secured to the adjacent guide plates 28, and therefore are also connected to the associated work beam 26, 26a. Thus, locator bar assembly 32 is fixed against lateral movement while locator bar assembly 32a moves with work beam 26a.

Each of the locator bar assemblies comprises a rectangular elongate channel 40 (see FIG. 7) mounting a plurality of longitudinally spaced pairs of spring-loaded locator pins 42. Springs 44 act against an associated pin flange 46 to bias the pins upwardly above the upper surface of channel 40 and through suitable pin apertures 48 in its upper surface.

Adjacent their longitudinal ends locator bar assemblies 32, 32a are supported on a pair of flanged supports 50. Supports 50 are the portions of the locator bar assemblies that are secured to the adjacent guide plates 28. As best seen in FIG. 5, supports 50 define vertical slots 52, through which headed pins 54 project, the shank ends of headed pins 54 being fixedly secured to channels 40. Channels 40 are adapted to be raised and lowered by a double-acting pneumatic cylinder assembly 60 positioned at each end of each of channel 40. From each of the cylinder assemblies 60 a shaft 62 projects. Cylinders 60 are secured to associated flanged supports 50 by suitable webs 63. Shafts 62 are pinned to channels 40, thereby to elevate channels 40 to the positions shown, for example, in FIG. 1, where the associated locator pins 42 straddle the studs S (see also FIGS. 3 and 7), and from the retracted position of FIG. 5. The spaced pairs of locator pins 42 (on the locator bar assemblies 32, 32a) serve to position the studs S perpendicularly of the plates P, and to space them as desired, for example on 16-inch centers, thereby to properly orient and position the studs with respect to the plates. Cylinder assemblies 60 facilitate the withdrawal of the channels 40 and the associated locator pins 42 from the pin locating position of FIG. 1, thereby to permit easy removal of the wall section W after it has been suitably nailed together in the manner to be described.

The bed assembly 12 also provides means to provide ready longitudinal translocation of a finished assembled wall section W. Referring now especially to FIGS. 7 and 8, it will be seen that each of the work beams 26, 26a defines a plurality of longitudinally spaced aligned apertures 70 in the upper outer flange 72. Each such aperture 70 is proportioned to receive and accommodate a conveyor roller 74 which is positioned to be raised until its uppermost surface projects through an aperture 70 and above the upper surface of flange 72. In this position, the conveyor rollers 74 serve to provide a conveyor means for rollingly guiding a finished wall section W longitudinally of the machine, and out of end of and off of one end thereof.

Considering FIGs. 7 and 8, it will be seen that the conveyor rollers 74 on each side are rotatably journaled on an arm 76. Arms 76 are vertically shiftable with respect to beams 26, 26a, via pluralities of spaced vertical slots 78 in the vertical webs 79 of beams 26, 26a and cooperating slide pins 80 secured to arms 76 intermediate their tops and bottoms. Arms 76 are shifted vertically by pluralities of longitudinally spaced cams 82 corotatably mounted on rocker shafts 84. Rocker shafts 84, in turn, are corotatably secured to crank arms 86 which at their other ends are pivotally pinned to a rocker bar 88. Rocker bar 88 is adapted to be shifted longitudinally of the machine (FIG. 8) by a suitable double acting cylinder assembly 90 located at each side of the framing machine and connected to work beams 26, 26a. Thus, when a wall section has been finished, and it is desired to remove same, the cylinder assemblies 90 are actuated, the piston shafts thereof which are connected to the rocker bars 88 are shifted to the left (as viewed in FIG. 8), and the conveyor rollers 74 are moved from the inactive retracted position illustrated in FIGs. 1 and 7 to an active conveying position in which their upper surfaces project through the apertures 70 in work beam flanges 72.

Thus it is seen that the floor-mounted bed assembly 12 comprises means for locating the studs transversely of the bed via locator bar assemblies 32, 32a, means for lowering the locator channels 40 to move the locator pins 42 below the lower edges of the studs S, and retractable conveyor means for facilitating removal of a finished wall section W from the framing machine 10. Additionally, of course, the bed assembly provides support means for the plates and stud ends, i.e., the horizontal work surface or flanges 72 of work beams 26, 26a, to support the plates and stud ends during the nailing operation.

As stated, the bed assembly 12 also supports a longitudinally traveling carriage 14 which is adapted to be driven from one of the work beams 26, 26a to the other, and back and forth, parallel to plates P.

As seen in FIG. 1, traveling carriage 14 defines an inverted generally U-shaped frame. The frame (see also FIGS. 2, 11 and 12) comprises a pair of transverse main channels 100, a pair of longitudinally oriented channels 102 connected thereto, and pairs of vertical legs 104 connected to the ends of channels 102.

At the foot of each leg 104 a suitable web 106 rotatably mounting a V-roller 108 is provided. Rollers 108 ride on longitudinal V-tracks 110 connected, as by welding, to flanges 22 of support beams 18. The V-formation of the tracks and wheels minimizes the possibility of derailment, and guidingly supports the traveling carriage on support bed assembly 12.

To drive the traveling carriage 14, motor-driven pinions 112 engaging rack assemblies 24 are provided. Pinions 112 are rotatably mounted on mounting plates 114 and are driven through a gear 116 driven by chains 118. A reversible electric motor 120 having a clutch assembly is mounted at the top of the carriage and drives a drive shaft 122 at the ends of which sprockets engaging chains 118 are provided. Motor 120 therefore positively drives the traveling carriage at a constant preselected speed from one end to the other of the bed assembly through the racks and pinions.

Traveling carriage 14 also carries nailing assemblies, including suitable fastening means, such as nailing guns, located to drive fasteners such as nails through the plates into the ends of the studs to provide the desired wall sections W.

At each side of the traveling carriage 14 a reciprocatable fastening assembly or nailing carriage 130, 130a is provided. One of these, nailing carriage 130, is fixed to the main channels 100 against transverse movement, whereas the other nailing carriage 130a, via means to be explained, is adapted to be moved transversely. Common parts will be described with the same part numbers.

Each of the nailing carriages 130, 130a comprises a pair of vertical legs 132, 132a, respectively, vertically slidably guided in guide channels 134, 134a. Channels 134 are connected as by welding to main channels 100 and to a tie bar 136 securely bolted to channels 100 by U-bolts 138. Channels 134a are welded to a tie bar 136a which in turn is welded to a traversing assembly 140 carrying legs 132a.

At their upper ends, legs 132, 132a define forks receiving crossbars 142 which are pinned thereto by pins 144. Intermediate the ends of each crossbar 142, the shaft 146 of a vertical cylinder 148 is connected thereto. The cylinders 148 are fixed against vertical movement on tie bars 136, 136a, so that they are adapted to raise and lower crossbars 142, hence legs 132, 132a and the nailing carriages 130, 130a for a purpose to be described.

The lower ends of legs 132, 132a mount a plurality of rigid support plates for supporting various operating components of the framing machine 10. It will be seen, in FIG. 1, that the legs 132, 132a serve to rotatably support squaring rollers 150, two at each side, the two being longitudinally offset but in line. These squaring rollers traverse the inner edges of plates P and the adjacent outer ends of studs S to square them in a horizontal plane. Squaring rollers 150 are biased downwardly to perform their squaring function by the considerable weight of the legs 132, 132a and the associated carried components.

Legs 132, 132a also rotatably mount pairs of longitudinally spaced compression rollers 152. The compression rollers are resiliently urged toward each other from opposite sides at predetermined variable degrees of compression (and are transversely aligned perpendicularly to the longitudinal direction of the bed 12) and thus serve to compress the plates against the studs to hold them tight for nailing.

As stated previously, legs 132 of nailing carriage 130 are fixed against movement transversely of the machine. However, nailing carriage 130a is movable transversely of the machine for at least two purposes. One is to provide for the compressive resilient biasing by the compression rollers 152 and the other is to adapt a framing machine 10 to wall sections W of varying heights, or, in the orientation in which they are formed in framing machine 10, of varying transverse dimensions.

For major adjustments in wall heights, for example for changing a wall section worked on from 8 feet to 6 feet, the entire traversing assembly 140 is moved manually by handle 160 of threaded screw 162. Nut 161 is fixedly secured to guide carriage 166 which mounts guide rollers 168 which straddle and roll along channels 100. Traversing assembly 140 is connected to guide carriage 166 by an arm 172 secured at one end to carriage 166 and pinned at the other end to compression cylinder 174. The other end of the compression cylinder 174 mounts a piston 176 which in turn is connected to traversing assembly 140. The frame of traversing assembly 140 rotatably mounts a pair of elongate rollers 178 which ride on main channels 100.

Thus, when screw 162 moves guide carriage 166, it also causes traversing assembly 140 to move in concert to a new roughly adjusted position for nailing carriage 130a. Cylinder 174 provides for the fine adjustment to a position in which nailing carriage 130a will properly confront plate P and in which compression rollers 152 will resiliently act toward each other to properly hold and compress the plates against the studs during nailing.

It will be apparent that this occurs because traversing assembly 140 can move only with respect to guide carriage 166 after guide carriage 166 has been positioned suitably. The piston 176 moves transversely against the relatively fixed compression cylinder 174 thereby to move the traversing carriage 140 transversely of the channels 100.

For transverse adjustment and operation of the traversing carriage 140, and to operate on wall sections W of different heights it is also necessary to relocate work beam 26a. As noted above, work beam 26a and locator bar assembly 32a are connected by guide plates 28 adjacent their ends. The guide plates are positioned to facilitate slidable guidance of the work beam 26a on crossbeams 20. Neither work beam 26a nor locator bar assembly 32a is fixedly connected to the crossbeams, so when movement of them transversely of the machine is necessary they only need be slid over. This is done manually at the time the major adjustment of the traversing assembly 140 is made via screw 162.

The legs 132, 132a also mount support means for pairs of fastening means such as pneumatic nailers 154. At each side of nailing carriage 130, 130a a pair of nailers 154 (see FIG. 2) is provided, the nailers being offset vertically to provide two vertically offset nails 156 at each stud, and on each side of the framing machine (see FIG. 2).

The vertical position of the pneumatic nailers 154 is set by the squaring rollers 150 to which the legs 132, 132a and the connected elements are secured. Thus they will fire nails (in vertical elevation) at substantially the same location each time they are actuated. It is, however, important that the nails be fired well within the width of the studs and that pairs of nails be fired for each and every stud that is present. To that end, stud locators are provided for each nailer and are adapted to sense each stud, whether single or multiple abutting.

Referring now to FIGS. 1, 6, 9, and 10, support arms 200 mounted on legs 132, 132a project transversely of framing machine 10. Arms 200 mount depending legs 202 for supporting automatic stud sensing and locating means for sensing the longitudinal location of each stud. One such stud locator 204 is provided for each nailer 154, hence there are two stud locators at each side of the framing machine.

The stud locators 204 are pivotally secured to legs 202 via pivot pins 206, and comprise a pair of plates 208 apertured to pivot and oscillate on pivot pin 206. Plates 208 are tied together to maintain their parallel relationship. At their ends remote from the pivot pin 206, plates 208 define apertures serving as journals for a shaft 209 mounting a locating roller 210 and a concentric corotatably connected firing cam 212. Locating roller 210 presents a surface defining six equidistantly spaced pin-receiving apertures. Each such aperture receives and retains a spring-loaded 214 which is loaded to project outwardly as seen in FIGS. 6, 9, and 10, but which may be urged inwardly against spring force by a force exerted against it as when the pin contacts an upper surface of a double stud.

As seen in FIG. 9, as the traveling carriage moves, a pin 214 will contact a leading edge of a stud S. As carriage 14 continuously moves, the pin's forward movement will be arrested by engagement with a stationary stud causing locating roller 210 to rotate. As it rotates, so does corotatable firing cam 212. Automatically, as this occurs, cam follower arm 216 will raise which, at a predetermined elevation, will actuate pneumatic switch 218 for transmitting the presence of the stud to the associated pneumatic nailer 154, thereby causing a nail to be driven through a plate and into the stud.

Pins 214 are positioned, and locating roller is proportioned so that a single stud will actuate the associated nailer 154 only once. That is to say that the next pin will not contact the stud, but it will however be rotated to a position where the next single stud will interrupt its forward movement.

The stud locators 204 of this invention are also adapted to sense the location of abutting multiple studs, thereby to make certain that the associated nailer 154 is actuated to fire a nail through the plate P for each and every stud. Referring again to FIG. 9, it will be observed that forward movement of the traveling carriage will carry the first stud-contacting pin 214 to a position where the next pin will contact the leading edge or adjacent upper surface of a second stud S. The spring-loaded pin 214 will then be urged into retentive engagement with the second stud to cause the locating and sensing roller to rotate again, hence causing firing cam 212 to actuate the associated pneumatic nailer a second time via switch 218. In that manner, by using the stud locator of this invention, one can be certain that each and every stud will receive a nail from each pneumatic nailer, and for each stud.

It is important that the elevation of the locating rollers be properly maintained, so that bowed studs and the like will not cause missed firings or jamming of the locating and sensing rollers 210. Elevation control means are therefore provided for assuring the proper vertical positioning of the locating rollers with respect to the upper surface of the studs as the traveling carriage 14 traverses them. Each of the plate assemblies 208 mounts a vertical locating or elevational control means. Thus, shaft 209 carries an elevation control roller 224 which is freely rotatably journaled thereon. This elevation control roller 224 contacts the leading edge of a stud immediately prior to the secondary contact therewith by a pin 214 to raise the locating roller and pin 214 to its proper elevation, i.e., to a predetermined sensing attitude respecting the leading edges and upper surfaces of the studs. The elevation control roller leaves the stud after the locating roller and sensing pin 214 has been removed from stud contact. This then prevents jamming, misfiring, and missed firing which might otherwise result.

Finally to minimize relative movement of the stud locators about pivot pins 206, adjustable means are providing for an initial adjustment of the elevation of the stud locators 204, and for the associated rollers and firing cam. The plates 208 are tied together by a tie plate 226. This tie plate provides a vertical flange 228 defining a pair of threaded mounts for jack screws 230. The ends of the shanks of the jack screws contact an associated leg 202 to prevent relative downward movement of the stud locator 204 beyond that provided for by the screws. Thus, when an elevation control roller 224 contacts a stud, it is moved but slightly upwardly, more or less depending upon the squared or bowed condition of the particular stud contacted.

Pneumatic nailers 154 operate generally in accordance with U.S. Pat. No. 3,106,136, except that the triggering is caused pneumatically rather than manually. Referring now to FIGS. 4 and 9, when pneumatic switch 218 is tripped by firing cam 212, a pulse of high-pressure air travels through a suitable high-pressure conduit 250 to trigger the associated nailer 154 (FIG. 4). The high-pressure air acts against nailer piston 252 to bias it against compression spring 254 to raise pin 256, thereby to unseat ball 258 from its seat 260. When ball 258 is seated on seat 260 it permits air from the nailer reservoir (R) to pass into conduit 262 to maintain the nailer driver in an up position, as shown in FIG. 1 of U.S. Pat. No. 3,106,136. When ball 258 is moved to seat against seat 264, it closes off the communication with the reservoir (as described in said patent), which then allows air to enter above the driver piston to drive the piston and driver downwardly against a properly positioned fastener to be driven.

Upon the conclusion of a driving cycle, air switch 218 is closed (firing cam 212 having receded to a switch-closing position), the air is bled via switch 218 from conduit 250, ball 258 is again seated on seat 260, and the air is bled from the driving cylinder as described in said patent.

Although said patent illustrates the driving of staples from a staple magazine, of course nails may be similarly driven as by utilizing an appropriately configured nail driver and nail magazine. Such a magazine M is illustrated schematically in FIG. 4 where a plurality of nails are connected in belt form for automatic presentation in a known manner to the driver of a pneumatic nailer 154.

Referring now to the circuit diagram, FIG. 13, it will be seen that an electric power supply is provided to power solenoid-operated air switches for a number of the cylinder assemblies. Thus, double-acting cylinder assemblies 174 are operated through a solenoid-operated air switch 280 supplied by air directly from compressor 282. Cylinder assemblies 174 are adapted to resiliently bias and urge the compression rollers 152 toward each other at a pressure of about 40 p.s.i.

Similarly double-acting cylinders 148 for raising and lowering the nailer carriages 130, 130a are actuated in synchronization through a solenoid-operated air switch 284, also supplied by air directly from compressor 282. No downward pressure need be exerted against the squaring rollers 150 carried by carriages 130, 130a, although this may be done if desired.

The cylinders 90 for raising and lowering rollers 74 are also double acting and are operated in concert via a solenoid-operated air switch 286 supplied with air directly from compressor 282.

Cylinders 60 for raising and lowering locator bar assemblies 32, 32a are double acting and are operated via an air switch 288 supplied with air directly from compressor 282. Each of the air switches 280, 284, 286, and 288 are operated from a manually operated master switchboard 290 shown schematically in FIG. 2. Switch board 290 also provides on-off and reversing switches for the power supply for motor 120 to cause traveling carriage 14 to traverse bed assembly 12.

Nailers 154 are each provided with triggering air switches 218 which are fed from pressure tanks 292 fed by compressor 282. The main source of driving air for the nailers 154 is also derived from pressure tanks 292.

OPERATION

In operating the framing machine 10 of this invention, work beam 26a and the associated locator bar assembly 32a are moved transversely to position the guard flanges 30, 30a to accommodate the plates and studs sized to the desired wall section W. Then the traversing assembly 140 is brought to an approximately correct transverse position for the height of the wall section W to be fabricated by handle 160 and screw 162.

The nailing carriages, 130, 130a are held in their uppermost positions via cylinders 148, and the compression rollers 152 are held outwardly (as viewed in FIG. 1) via cylinder 174. The locator bar assemblies 32, 32a are in their up position and the conveying rollers 74 are in their down positions. The carriage 14 is positioned at one end of the bed assembly 12.

The plates P are then located on the work beams 26, 26a and the studs S are positioned with their ends on work beams 26, 26a adjacent plates P, the intermediate portions of the studs being bridged by the pins 42 of the locator bar assemblies 32, 32a.

Considering FIG. 3, with the wall section there illustrated, it will be observed that where double studs are located, the locator pins 42 are urged downwardly by an overlying stud against the force exerted by springs 44. The springs are weak enough so that they do not force the overlying stud upwardly or over on its side.

After the studs and plates have been properly positioned in a skeleton frame array on the work surfaces provided by bed assembly 12, the nailing carriages 130, 130a are brought downwardly by cylinder 148, and nailing carriage 130a is moved toward fixed nailing carriage 130 by cylinder 174 to resiliently bias the compression rollers 152 against the outer surfaces of the plates in the vicinity of the nailers 154 to bias them toward each other and against the intermediate studs. At this point in time, the squaring rollers 150 will be properly positioned on the plates to traverse the abutting edges of the plates and studs to square them during the nailing operation.

At the time the nailing carriages 130, 130a are brought into their operating position, the stud locators 204 are also brought into their stud contacting and sensing positions as illustrated in FIG. 1.

Then the motor 120 for the traveling carriage 14 is energized and it travels via racks 24 and pinions 112 at a speed, for example, of about 25 feet per minute from one end of the plates P to the other end of the plates where double or triple studs are present, or up to about 35 feet per minute where only single studs are present. During this movement, the stud locators 204, each time they contact a stud, cause a pneumatic nailer 154 to be actuated to drive a nail in the manner previously described. When the traveling carriage has finished its longitudinal travel along the plates P, it contacts an appropriately positioned limit switch 300 and the associated clutch for the motor 120 is automatically disengaged. The nailing carriages 130, 130a are then automatically raised to their up position, cylinder 174 moves traversing assembly 140 outwardly and cylinders 60 retract channels 40 to carry the locator pins below the lowermost surface of the studs.

The cylinders 90 are actuated to raise conveyor rollers 74 upwardly into work beam apertures 70 to facilitate and permit rollout of the finished wall section W.

Thereafter, the rollers 74 are retracted and the next wall section skeleton array is placed on the work surfaces. Then nailing carriages 130, 130a are dropped into position, preferably in timed automatic sequence with operation of the traversing assembly 140 and reengagement of the clutch for motor 120 for the rack and pinion drive means to drive the traveling carriage along the next wall section skeleton array. The nailing carriages may be dropped directly onto the plates at their ends or may be dropped in front of the plates to engage the plates, and studs, after the traveling carriage begins its movement along the bed.

It will be apparent that the traveling carriage is driven continuously from one end of the bed to the other by reversible motor 120 and operates in both directions making it possible to start it from either end to assemble a wall section W.

Although separate manual air switches have been illustrated in FIG. 13 for each of cylinders 60, 90, 148, 174, and limit switches 300 have been shown to operate the clutch for motor 120, it is of course clear that additionally a timed master sequence control switch assembly 302 may be provided to automatically sequentially operate the switches, in timed sequence, and in the manner described.

It has been seen that the traveling carriage 14 traverses the support bed assembly 12 continuously, not intermittently, thereby firing the nails on the fly. In the vicinity of the nailers the wall section skeleton array is continuously compressed transversely of the array to hold the plates tightly against the studs, and the plate and stud ends are continuously squared. The nailers are continuously guided from one end of the plates to the other, and the presence of each stud, whether single or multiple abutting, is automatically sensed, thereby to automatically actuate an associated nailer each time a stud is present. After completion of the fastening of the skeleton array, the traveling carriage is automatically stopped and the nailing carriages and locator bar assemblies are retracted and withdrawn automatically for removal of the wall section.

It will be apparent to those skilled in the art from the foregoing that modifications may be made in the framing machine without departing from the spirit of this invention, and that the term "wall section" as used herein contemplates vertical wall sections, ceiling sections and any other desired skeleton frame section.

What is claimed is:

1. A framing machine for automatically fastening together a plurality of members to provide a prefabricated skeleton wall section, in which said wall section comprises a pair of parallel, elongate, spaced-apart stringers and a plurality of parallel, perpendicularly oriented elongate spanners spanning the space between the stringers, an elongate support bed, a pair of spaced work surfaces on said support bed for supporting said stringers and the adjacent ends of said spanners, a traveling carriage drivingly mounted on said support bed and which continuously moves therealong in a direction parallel to said work surfaces from one end of said stringers to the other end of said stringers, and a plurality of fastening means carried by said traveling carriage for fastening said spanners to said stringer by driving fasteners through said stringers into said spanners while said traveling carriage is moving, said traveling carriage carrying means for automatically sensing the location of each spanner, and means for transmitting the sensed location of each spanner to actuate an associated fastening means.

2. A framing machine for automatically fastening together a plurality of members to provide a prefabricated skeleton wall section, in which said wall section comprises a pair of parallel, elongate, spaced-apart stringers and a plurality of parallel, perpendicularly oriented elongate spanners spanning the space between the stringers, an elongate support bed, a pair of spaced work surfaces on said support bed for supporting said stringers and the adjacent ends of said spanners, a traveling carriage drivingly mounted on said support bed and which continuously moves therealong in a direction parallel to said work surfaces from one end of said stringers to the other end of said stringers, a plurality of confronting fastening means carried by said traveling carriage and being continuously biased toward each other from one end of said stringers to the other for fastening said spanners to said stringers by driving fasteners through said stringers into said spanners while said traveling carriage is moving, and means for automatically sensing the location of each spanner and means for transmitting the sensed location of each spanner to actuate an associated fastening means.

3. In the framing machine of claim 1 in which said sensing means includes means to sense the presence of a plurality of abutting spanners thereby to facilitate actuation of the associated fastening means once for each abutting spanner.

4. In the framing machine of claim 3 in which said sensing means comprises a spanner contacting roller and cam assembly and in which the cam operates said transmitting means once for each spanner.

5. In the framing machine of claim 4 in which said spanner-contacting roller and cam assembly comprises elevation control means for placing a spanner-contacting roller in a predetermined sensing attitude to the leading edges and the upper surfaces of contacted spanners.

6. In the framing machine of claim 1 in which said traveling work carriage carries a pair of reciprocable fastening assemblies which move toward and away from said work surfaces, means for moving said fastening assemblies toward and away from said work surfaces, said fastening means being carried by said fastening assemblies.

7. In the framing machine of claim 6 further comprising means for moving one of said fastening assemblies toward and away from the other of said fastening assemblies transversely of said elongate support bed.

8. In the framing machine of claim 7 in which each of said fastening assemblies carried compression means adapted to act against said stringers to resiliently bias them toward each other and against the spanners in the vicinity of the fastening means.

9. In the framing machine of claim 6 in which each said fastening assembly carries means for squaring said stringers and the adjacent ends of said spanners in the vicinity of the fastening means.

10. In the framing machine of claim 6 in which said traveling carriage carries means for automatically sensing the location of spanners for each fastening means, said sensing means comprising elevation control means initially contacting said spanners and fastener control means secondarily contacting said spanners for actuating said fastening means for each spanner contacted.

11. In the framing machine of claim 1 in which said work surfaces are provided with cooperable elevatable and retractable conveyor means for rolling withdrawal of a finished wall section from said framing machine.

12. In the framing machine of claim 1 in which said traveling carriage carries stringer contacting means for resiliently biasing said stringers towards each other in the vicinity of said fastening means.

13. In the framing machine of claim 1 in which said traveling carriage carries means for squaring the stringers with adjacent spanner ends immediately prior to fastening them in the vicinity of said fastening means.

14. In the framing machine of claim 1 in which means are provided for spacedly locating said spanners along the longitudinal extent of said stringers.

15. In a framing machine having a support bed, a carriage adapted to travel from one end of said support bed to the other, said support bed having work surfaces to support spaced-apart stringers and perpendicular spanners to be fastened to said stringers, and means carried by said carriage for fastening said stringers to said spanners, means carried by said carriage for sensing the location of said spanners and for actuating associated fastening means, said sensing means comprising means for contacting the leading edge of each of said spanners, means for automatically positioning said contacting means at a predetermined elevation with respect to the upper surface of each spanner successively contacted, and means carried by said sensing means for assuring sensing of each successive spanner including abutting adjacent spanners.

16. In the framing machine of claim 15 in which said sensing means further comprises a triggering cam for actuating an associated fastening means for each spanner contacted by said sensing means.

17. In the framing machine of claim 15 in which said sensing means comprises a roller, and said assuring means comprise pin members projecting from said roller for contacting said spanners, and wherein each spanner causes said roller to rotate sufficiently to actuate an associated fastening means once for each spanner contacted.

18. In the framing machine of claim 15 in which said sensing means is mounted on an oscillatable support carried by said carriage, said oscillatable support mounting said means for automatically positioning said contacting means at said predetermined elevation, and said sensing means comprising a rotatable member, said rotatable member carrying projecting members for assuring sensing contact with each successive spanner, switch means, and means corotatable with said rotatable member for operating said switch means for actuating said associated fastening means.

19. In the framing machine of claim 18 in which said traveling carriage mounts a plurality of independent oscillatable supports and sensing means, one for each of a plurality of fastening means, thereby successively to fasten said stringers to said spanners at each of said stringers.

* * * * *

UNITED STATES PATENT OFFICE
CERTIFICATE OF CORRECTION

Patent No. 3,628,714                     Dated December 21, 1971

Inventor(s) Josef Offenwanger

It is certified that error appears in the above-identified patent and that said Letters Patent are hereby corrected as shown below:

Column 3, line 20, "surface" should be -- surfaces --;

Column 4, line 6, delete "end of";

Column 6, line 44, before "214" insert -- pin --;

Column 8, line 54, "cylinder" should be -- cylinders --;

Column 9, line 67, "stringer" should be -- stringers --;

Column 10, line 1 of Claim 6, "1" should be -- 2 --;

Column 10, line 1 of Claim 11, "1" should be -- 2 --;

Column 10, line 1 of Claim 12, "1" should be -- 2 --;

Column 10, line 1 of Claim 13, "1" should be -- 2 --;

Column 10, line 1 of Claim 14, "1" should be -- 2 --.

Signed and sealed this 6th day of June 1972.

(SEAL)
Attest:

EDWARD M. FLETCHER, JR.
Attesting Officer

ROBERT GOTTSCHALK
Commissioner of Patents